United States Patent [19]

Buljan et al.

[11]  4,421,528

[45]  Dec. 20, 1983

[54] PROCESS FOR MAKING A MODIFIED SILICON ALUMINUM OXYNITRIDE BASED COMPOSITE CUTTING TOOL

[75] Inventors: Sergej-Tomislav Buljan, Acton; Vinod K. Sarin, Lexington, both of Mass.

[73] Assignee: GTE Laboratories Incorporated, Waltham, Mass.

[21] Appl. No.: 380,361

[22] Filed: May 20, 1982

[51] Int. Cl.$^3$ ............................................. B24D 3/02
[52] U.S. Cl. ...................................... 51/309; 51/295;
51/308; 264/60; 264/65; 264/85; 501/154
[58] Field of Search ................. 51/295, 307, 308, 309;
264/60, 65, 85, 332; 501/154

[56] References Cited

U.S. PATENT DOCUMENTS 4,113,503  9/1978  Lumby et al. ...................... 501/154
4,131,459  12/1978  Phillips ................................ 75/203
4,147,759  4/1979  Demit ................................. 423/327
4,252,768  2/1981  Perkins et al. ..................... 264/332

FOREIGN PATENT DOCUMENTS 2353093  5/1974  Fed. Rep. of Germany .
537986  3/1977  U.S.S.R. .

*Primary Examiner*—Donald E. Czaja
*Assistant Examiner*—W. Thompson
*Attorney, Agent, or Firm*—Ivan L. Ericson

[57] ABSTRACT

An improved modified silicon aluminum oxynitride based composite cutting tool is made by forming a homogeneous matrix of a modified silicon aluminum oxynitride prior to uniformly dispersing a hard refractory material throughout the homogeneous matrix, then densifying the combined materials to form a composite cutting tool having a density greater than 98 percent of the theoretical density of the combined materials.

20 Claims, No Drawings

PROCESS FOR MAKING A MODIFIED SILICON ALUMINUM OXYNITRIDE BASED COMPOSITE CUTTING TOOL

CROSS REFERENCE TO RELATED APPLICATIONS

This application contains subject matter related to matter disclosed and claimed in co-pending patent application Ser. No. 128,070 filed Mar. 7, 1980, now abandoned, entitled "Abrasion Resistant Silicon Nitride Based Articles" and in the following co-pending applications filed concurrently herewith, all assigned to the assignee of the present application:

Application Ser. No. 380,364, entitled "Composite Ceramic Cutting Tool";

Application Ser. No. 380,384, entitled "Carbide Coated Silicon Nitride Cutting Tools";

Application Ser. No. 380,363, entitled "Alumina Coated Silicon Nitride Cutting Tools";

Application Ser. No. 380,381, entitled "Carbonitride Coated Silicon Nitride Cutting Tools";

Application Ser. No. 380,383, entitled "Nitride Coated Silicon Nitride Cutting Tools";

Application Ser. No. 380,362, entitled "Carbide Coated Composite Silicon Nitride Cutting Tools";

Application Ser. No. 380,379, entitled "Alumina Coated Composite Silicon Nitride Cutting Tools";

Application Ser. No. 380,382, entitled "Carbonitride Coated Composite Silicon Nitride Cutting Tools";

Application Ser. No. 380,380, entitled "Nitride Coated Composite Silicon Nitride Cutting Tools";

Application Ser. No. 380,387, entitled "Carbide Coated Composite Modified Silicon Aluminum Oxynitride Cutting Tools";

Application Ser. No. 380,388, entitled "Alumina Coated Composite Modified Silicon Aluminum Oxynitride Cutting Tools";

Application Ser. No. 380,389, entitled "Carbonitride Coated Composite Modified Silicon Aluminum Oxynitride Cutting Tools";

Application Ser. No. 380,452, entitled "Nitride Coated Composite Modified Silicon Aluminum Oxynitride Cutting Tools".

Field of the Invention

This invention relates to a process for making an improved abrasion resistant cutting tool. More particularly, it is concerned with a process for obtaining an abrasion resistant cutting tool comprising a hard refractory material distributed in a homogeneous matrix containing a modified silicon aluminum oxynitride.

Background of the Invention

It is known to disperse hard refractory metals like molybdenum and tungsten in a solid solution matrix of aluminum oxide, silicon nitride and aluminum nitride by simultaneous mixing with a binder, sieving and then sintering as described in U.S. Pat. No. 4,131,459 to Phillips. U.S. Pat. No. 4,252,768 to Perkins et al describes simultaneous mixing of a pre-screened $Si_3N_4$, $Al_2O_3$, AlN, TiC and a binder, sieving and then sintering. U.S.S.R. Pat. No. 537986 to Gnesin describes simultaneous milling and mixing of silicon nitride 75% b/w, titanium carbide 17% b/w and magnesium oxide (aluminum oxide) 11% b/w. Then the dried mixture is hot pressed. Simultaneous milling and/or mixing of the materials followed by sintering, either by hot pressing or otherwise consolidating to obtain a dense article generally results in an inhomogeneous distribution of the matrix-modifying phase causing a localized variation of the matrix properties which is not desirable.

OBJECTS OF THE INVENTION

Accordingly, it is an object of the present invention to provide an improved process for making an abrasion resistant cutting tool.

It is another object of this invention to provide an improved process for making a homogeneous matrix having a hard refractory material uniformly dispersed throughout the homogeneous matrix.

Further and other objects of the present invention will become apparent from the description contained herein.

SUMMARY OF THE INVENTION

In accordance with the present invention, there is provided a new and improved process for making an abrasion resistant cutting tool.

The abrasion resistant cutting tool comprises a hard refractory material distributed in a homogeneous matrix containing a modified silicon aluminum oxynitride.

The process comprises mixing from about 20 to about 90 volume percent silicon nitride, from about 5 to about 60 volume percent aluminum oxide, and from about 2 to about 25 volume percent of a modifier to form a mixture.

The mixture is reacted by heating to a temperature from about 1400° C. to about 1800° C. for a period of time from about 1 hour to about 8 hours in a non-oxidizing atmosphere to form a reacted mixture.

A blend comprising from about 40 to about 95 volume percent of the reacted mixture and from about 5 to about 60 volume percent of the hard refractory material is then comminuted to form a composite blend. This composite blend is densified to form a homogeneous matrix of said reacted mixture which has a dispersed phase of the refractory material throughout the homogeneous matrix. The composite blend is densified sufficiently to obtain a density greater than 98 percent of theoretical density of the composite blend. Modified silicon aluminum oxynitride based composite cutting tools of improved performance can be obtained from the above-described densified composite blend.

For a better understanding of the present invention, together with other and further objects, advantages and capabilities thereof, reference is made to the following disclosure and appended claims.

DETAILED DESCRIPTION OF THE PREFERRED EMBODIMENTS

Co-pending application Ser. No. 380,364 describes a preparation of modified silicon aluminum oxynitride based cutting tool. It is fabricated from a mechanical mixture of $Si_3N_4$, $Al_2O_3$, a modifying phase consisting of one or more of the oxides of Si, Y, Mg, Be, Hf, Ce, Zr, the lanthanides, mixtures, and solid solutions thereof, and a dispersed hard refractory material consisting of one or more of the carbides and/or nitrides and/or carbonitrides of Ti, Hf, W, Nb, Ta, V, mixtures, and solid solutions thereof. The mechanical mixture is then sintered, hot-pressed or otherwise consolidated by hot-isostatic pressing to obtain a dense article. The average particle size of the hard refractory material ranges between about 0.5 microns and about 20 microns for the cutting tool application. The average particle size of the hard refractory material falls preferably in the range between about 0.5 microns and about 5 microns. The hard refractory material comprises from about 5 to about 60 volume percent of the densified article.

Hard refractory materials of dispersed phase are represented by carbides and/or nitrides and/or carbonitrides of Ti, Hf, W, Nb, Ta, V, combinations, and solid solutions thereof. The hardness of the cutting tools made from the densified articles increases with the increased content of the hard refractory material. However, in order to obtain the highest hardness together with the highest fracture toughness, the preferred range of hard refractory material additions is from about 20 to about 40 volume percent, an optimum composition being indicated at about 30 volume percent.

The resistance to chemical wear of this type of tool in applications such as steel machining increases with $Al_2O_3$ content. The $Al_2O_3$ additions should be in the range from about 5 to about 60 volume percent and more preferably from about 10 to about 30 volume percent.

In order to fully utilize the advantages of the distributed hard refractory phase and to obtain a composite cutting tool with optimized chemical and mechanical wear resistance properties, it is preferred that the average particle size of the hard refractory material range between about 0.5 microns to about 20 microns in size, preferably between about 0.5 microns to about 5 microns.

Properties of the particulate composite cutting tool of this invention are tailored for particular applications through structural modification of the composite by control of the particle size, distribution, and concentration of the hard refractory particulate. It has been observed, for example, that the presence of coarse particles having a size greater than about 20 microns greatly increases the probability of tool chipping and catastrophic tool failure during machining. Large particles of the hard refractory material were always noted at the point of fracture origin in photomicrographs of fracture surfaces. It was also noted that room temperature and elevated temperature strengths decrease with increasing particle size of the hard refractory, although there was an improvement in fracture toughness.

In order to optimize mechanical properties for intended cutting tool applications, it is preferred that the average particle size of the dispersed hard refractory carbide and/or nitride and/or carbonitride phase be below about 20 microns and more preferably between about 0.5 microns to 5 microns.

Finer dispersion of the hard refractory material of the composite of the invention also improves chemical homogeneity of the cutting tool. In machining applications where chemical interaction takes place predominantly between the matrix and the workpiece material, improved chemical homogeneity of the composite decreases wear while insuring that any wear of the cutting tool is uniform.

To tailor the chemical composition of the composite tool of this invention for specific applications; i.e., machining conditions, the dispersed phase may be varied. Titanium nitride, titanium carbide, and titanium carbonitride are preferred hard refractory materials for inclusion in composite cutting tools of this invention. In those applications where it is important to minimize chemical wear, titanium nitride is preferred to titanium carbide. Additionally, titanium nitride exhibits better resistance to oxidation than titanium carbide in composite cutting tools of the invention. Combinations of titanium carbide and titanium nitride or titanium carbonitride itself have been found to be preferable under certain machining conditions to optimize mechanical and overall machining properties.

It has been found that mechanical mixtures result in smaller and larger inhomogeneities in the distribution of the modifying phase of the order of 5 to 300 microns in size, resulting in localized variation of the properties of the matrix. The homogeneity of the cutting tool material is an extremely important factor for tool performance. During cutting only a small portion of the tool is exposed to high stress and elevated temperatures. The temperature induced changes in mechanical properties in the affected area, which are composition dependent, contribute to fracture and chip formation at the edge of the cutting tool. These factors alter and increase the rate of tool wear.

The properties of the matrix phase and therefore overall properties of the composite are also affected by the presence of any $SiO_2$ in the starting $Si_3N_4$ powder. The $SiO_2$ content if present is usually of the order of about 0.1 to about 5 volume percent, but can sometimes be more than 5 volume percent. $SiO_2$ is a glass former and a change in its quantity will affect the mechanical properties of the composite at elevated temperatures. Therefore, it is advantageous to control the $SiO_2$ content.

Modified silicon aluminum oxynitride based composite cutting tools of improved performance can be obtained by pre-reacting a mixture of the above-mentioned matrix constituents: $Si_3N_4$, with or without $SiO_2$, from about 2 to about 25 volume percent of a modifying phase consisting of one or more of the oxides of Si, Y, Mg, Hf, Ce, Zr, Be, the lanthanides and combinations thereof, and from about 5 to about 60 volume percent $Al_2O_3$ in a non-oxidizing atmosphere; e.g., nitrogen, argon, helium, at temperatures ranging from about 1400° C. to about 1800° C., more preferably from about 1600° C. to about 1800° C. for a period of about 1 to about 8 hours.

A blend of the prepared pre-reacted mixture in an amount from about 95 to about 40 volume percent and from about 5 to about 60 volume percent of a hard refractory metal carbide, nitride or carbonitride is then comminuted; i.e., ballmilling, attrition milling, high energy air milling, with the pre-reacted mixture forming a composite blend. The composite blend is densified to a density of greater than 98 percent of the theoretical density of the composite blend by pressing and sintering, hot-pressing, gas overpressure sintering, or hot-isostatic pressing in an inert gas atmosphere; i.e., $N_2$, Ar. The atmosphere is preferably argon when the hard refractory material is a refractory metal carbide. The pressing and sintering is done at about 1600° C. to about 1800° C., more preferably at about 1700° C. to about 1800° C. The hot-pressing is done at a pressure greater than 2000 psig (13,790 $kN/M^2$) and a temperature from about 1600° C. to about 1900° C., more preferably from about 1700° C. to about 1900° C. The gas overpressure sintering is done at a gas overpressure from about 150 to 200 psig (about 1,030 to about 1,380 $kN/M^2$) and a temperature from about 1600° C. to 1950° C., more preferably from about 1700° C. to 1950° C., and the hot-isostatic pressing is done at a pressure greater than 10,000 psig (68,947 $kN/M^2$) and a temperature from about 1600° C. to 1900° C., more preferably from about 1700° C. to 1800° C.

The above process steps improve the performance of the abrasion resistant article because of the improved homogeneity of the matrix phase and the uniformly distributed hard refractory material dispersed therein.

The following examples are provided to enable one skilled in the art to practice the invention. These examples, however, are to be viewed merely as illustrative of the present invention and should not be viewed as limiting the scope of the invention as defined by the appended claims.

EXAMPLE 1

To 41.7 w/o of $Si_3N_4$, which can contain from 0 to about 5 v/o $SiO_2$, add about 32.85 w/o $Al_2O_3$ powder and 4.02 w/o $Y_2O_3$. The resulting mixture is thoroughly mixed by dry bailmilling, then heat treated at 1725° C. for 5 hours in a nitrogen atmosphere to produce a pre-reacted modified silicon aluminum oxynitride. To 0.70 parts by volume of the pre-reacted modified silicon aluminum oxynitride add 0.30 parts by volume of TiC powder. To the powder mixture of TiC and pre-reacted modified silicon aluminum oxynitride add about 2.5 parts by weight toluene, about 0.1 parts by weight methanol, and about 0.05 parts by weight stearic acid. The resulting slurry is thoroughly mixed by ballmilling and then dried at 75° C. The resulting dry mixture is ballmilled for about 24 hours to obtain a uniformly distributed TiC throughout the pre-reacted modified silicon aluminum oxynitride. This ballmilled mixture is blended with about 0.05 parts by weight polyethylene glycol-methoxypolyethylene glycol copolymer, 1 part by weight toluene and about 0.05 parts by weight methanol. This mixture is ballmilled for about 30 minutes, dried at 75° C. and then screened through a 60 mesh screen. The minus 60 mesh fraction is pressed at about 25,000 psig (173,370 $kN/M^2$) to obtain a green compact. The residual solvents and binders in the green compact are removed by heating at 600° C. in an inert atmosphere. The green compact is then sintered to a hard, highly densified product by heating to temperatures of 1700° C. to 1850° in argon, for 1½ hours.

EXAMPLE 2

To 41.7 w/o of $Si_3N_4$ add about 32.85 w/o $Al_2O_3$ powder and 4.02 w/o $Y_2O_3$. The resulting mixture is thoroughly mixed by dry ballmilling, then heat treated at 1725° C. for 5 hours in a nitrogen atmosphere to produce a pre-reacted modified silicon aluminum oxynitride. To 0.70 parts by volume of the pre-reacted modified silicon aluminum oxynitride add 0.30 parts by volume of TiC powder. To the powder mixture of TiC and pre-reacted silicon aluminum oxynitride add about 2.5 parts by weight toluene, about 0.1 parts by weight methanol. The resulting slurry is thoroughly mixed by ballmilling and then dried at 75° C. The dry mixture is ballmilled for about 24 hours and then screened through a 60 mesh screen. The minus 60 mesh fraction is pressed at about 3000 psig (20,680 $kN/M^2$) at a temperature of about 1700° C. in argon to produce a hard, highly densified product.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for obtaining an abrasion resistant cutting tool having a hard refractory material distributed in a homogeneous matrix containing a modified silicon aluminum oxynitride comprising:

mixing from about 20 to about 90 volume percent silicon nitride, from about 5 to about 60 volume percent aluminum oxide, and from about 20 to about 25 volume percent of a modifier to form a mixture;

reacting said mixture at a temperature from about 1400° C. to about 1800° C. for a period of time from about one to about eight hours in a non-oxidizing atmosphere to form a reacted mixture;

comminuting a blend comprising from about 40 to about 95 volume percent of said reacted mixture and from about 5 to about 60 volume percent of a hard refractory material to form a composite blend; and densifying said composite blend to form a homogeneous matrix of said reacted mixture having a dispersed phase of said hard refractory material throughout said homogeneous matrix, said densifying being sufficient to obtain a density greater than 98 percent of theoretical density of said composite blend.

2. A process according to claim 1 wherein:
said modifier is an oxide selected from the group consisting of Si, Y, Hf, Ce, Zr, Mg, Be, the lanthanides, and combinations thereof.

3. A process according to claim 1 wherein said hard refractory material is selected from the group consisting of TiC, TiN, Ti(C,N), HfC, HfN, Hf(C,N), WC, W(C,N), VC, VN, V(C,N), TaC, TaN, Ta(C,N), and combinations thereof.

4. A process according to claim 1 wherein:
said hard refractory material is a carbide selected from the group consisting of TiC, HfC, WC, VC, TaC, and combinations thereof.

5. A process according to claim 1 wherein:
said hard refractory material is a nitride selected from the group consisting of TiN, HfN, and combinations thereof.

6. A process according to claim 1 wherein:
said hard refractory material is a carbonitride selected from the group consisting of Ti(C,N), Hf(C,N), and combinations thereof.

7. A process according to claim 1 wherein:
said mixture is heated to a temperature from about 1600° C. to about 1800° C.

8. A process according to claim 1 wherein:
said non-oxidizing atmosphere is a gas selected from the group consisting of nitrogen, helium, argon, and combinations thereof.

9. A process according to claim 1 wherein said densifying comprises:

pressing said composite blend to form a composite body; and sintering said composite body at a sintering temperature from about 1600° C. to about 1800° C. in an inert gas atmosphere to form a homogeneous matrix of said reacted mixture having a dispersed phase of said hard refractory material throughout said homogeneous matrix, said densifying being sufficient to obtain a density greater than 98 percent of theoretical density of said composite blend.

10. A process according to claim 9 wherein:
said sintering temperature is from about 1700° C. to about 1800° C.

11. A process according to claim 9 wherein:

said inert gas atmosphere is a gas selected from the group consisting of nitrogen, argon, and combinations thereof.

12. A process according to claim 1 wherein said densifying comprises:

hot-pressing said composite blend at a pressure greater than 2000 psig (13,790 kN/M$^2$) and a temperature from about 1600° C. to about 1900° C. in an inert gas atmosphere to form a homogeneous matrix of said reacted mixture having a dispersed phase of said hard refractory material throughout said homogeneous matrix, said densifying being sufficient to obtain a density greater than 98 percent of theoretical density of said composite blend.

13. A process according to claim 12 wherein:
said temperature of said hot-pressing is from about 1700° C. to about 1900° C.

14. A process according to claim 12 wherein:
said inert gas atmosphere is a gas selected from the group consisting of nitrogen, argon, and combinations thereof.

15. A process according to claim 1 wherein said densifying comprises:

gas overpressure sintering at a gas overpressure from about 150 psig to about 200 psig (about 1,030 to about 1,380 kN/M$^2$) and a temperature from about 1600° C. to about 1950° C. in an inert gas atmosphere to form a homogeneous matrix of said reacted mixture having a dispersed phase of said hard refractory material throughout said homogeneous matrix, said densifying being sufficient to obtain a density greater than 98 percent of theoretical density of said composite blend.

16. A process according to claim 15 wherein:
said temperature of said gas overpressure sintering is from about 1700° C. to about 1950° C.

17. A process according to claim 15 wherein:
said inert gas atmosphere is a gas selected from the group consisting of nitrogen, argon, and combinations thereof.

18. A process according to claim 1 wherein said densifying comprises:

hot-isostatic pressing at a pressure greater than 10,000 psig (68,947 kN/M$^2$) and a temperature from about 1600° C. to about 1900° C. in an inert gas atmosphere to form a homogeneous matrix of said reacted mixture having a dispersed phase of said hard refractory material throughout said homogeneous matrix, said densifying being sufficient to obtain a density greater than 98 percent of theoretical density of said composite blend.

19. A process according to claim 18 wherein:
said temperature of said hot-isostatic pressing is from about 1700° C. to about 1800° C.

20. A process according to claim 18 wherein:
said inert gas atmosphere is a gas selected from the group consisting of nitrogen, argon, and combinations thereof.

* * * * *